United States Patent [19]

Barlow

[11] 3,776,612

[45] Dec. 4, 1973

[54] PRODUCTION OF COMPOSITE MATERIALS

[75] Inventor: John Barlow, Willenhall, England

[73] Assignee: G.K.N. Group Services Limited, Smethwick, Warley, England

[22] Filed: July 22, 1971

[21] Appl. No.: 165,303

[30] Foreign Application Priority Data
July 29, 1970 Great Britain............... 36,652/70
Sept. 22, 1970 Great Britain............... 44,972/70

[52] U.S. Cl.............. 308/238, 308/237, 161/170, 161/176
[51] Int. Cl. .................................... F16c 27/00
[58] Field of Search............. 161/168, 170, 205, 161/175, 176, 172, 42; 308/237, 238

[56] References Cited
UNITED STATES PATENTS

| | | | |
|---|---|---|---|
| 3,455,662 | 7/1969 | Alexander et al. ............. | 29/191.4 |
| 3,491,055 | 1/1970 | Talley ............................. | 161/170 |
| 3,572,971 | 3/1971 | Seiwert ........................... | 416/230 |
| 3,575,783 | 4/1971 | Kreider .......................... | 161/207 |
| 3,616,300 | 10/1971 | Ahmad ........................... | 161/170 |
| 3,616,508 | 11/1971 | Wallett .......................... | 29/156.8 R |

*Primary Examiner*—William J. Van Balen
*Attorney*—Holman & Stern

[57] ABSTRACT

A bearing material comprising a metal matrix reinforced with less than 50 percent by volume fibres is disclosed. Preferably the fibres comprise 10 to 25 percent by volume of the bearing material and may be carbon or asbestos fibres whilst the matrix may be lead, a lead/tin alloy or silver.

The bearing material may be provided with a steel backing strip to form a thin wall bearing component.

9 Claims, 1 Drawing Figure

PATENTED DEC 4 1973 3,776,612
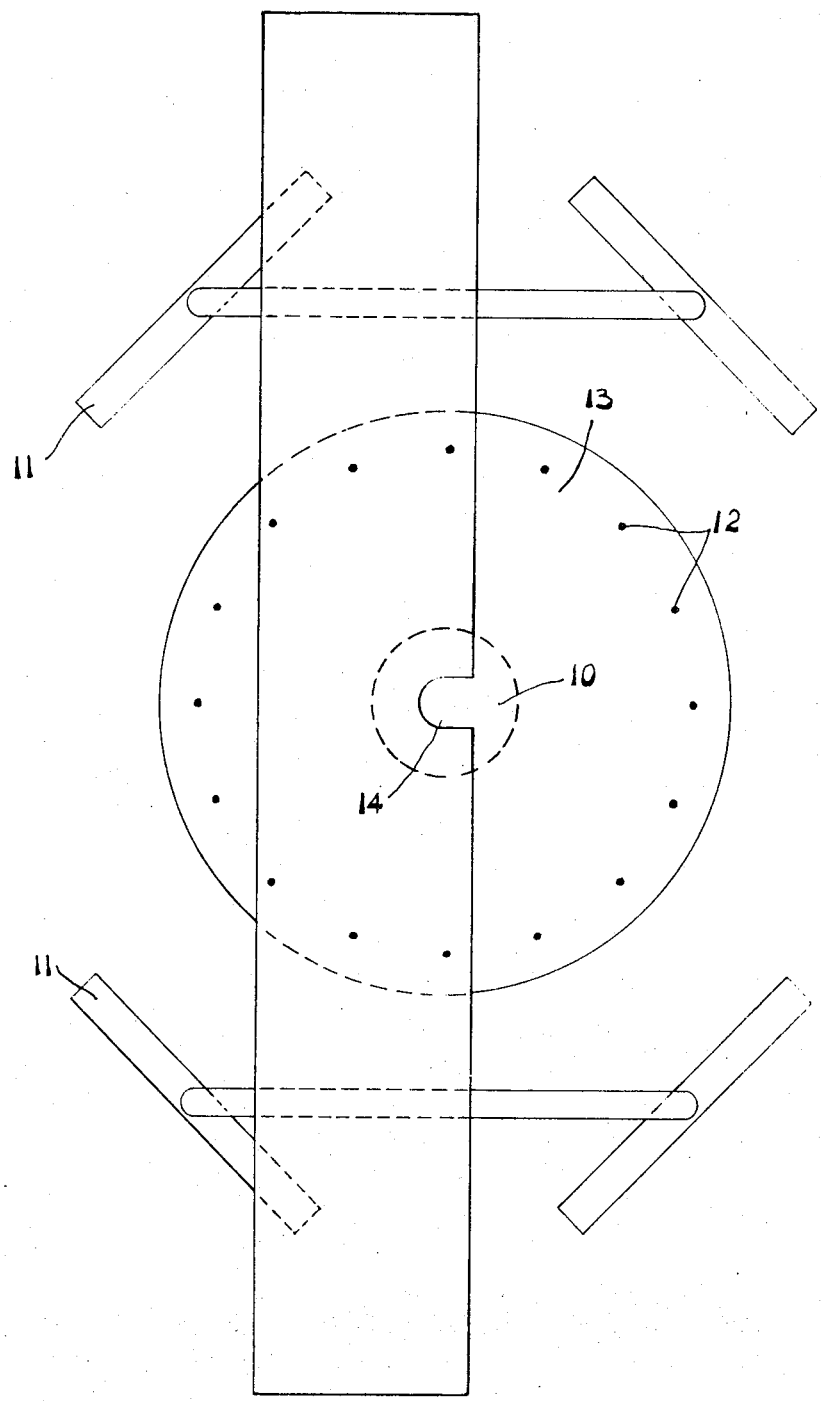

PRODUCTION OF COMPOSITE MATERIALS

BACKGROUND OF THE INVENTION

1. Field of the Invention

This invention relates to a bearing material, comprising a metal matrix reinforced by fibres.

2. Description of the Prior Art

Hitherto a bearing material of the type described above generally included 50 percent or even more by volume of fibres and the bearing surface of a bearing component made out of the bearing material has been at least mainly constituted by the fibres whilst the metal matrix has constituted a binder for the fibres.

SUMMARY OF THE INVENTION

An object of the present invention is to provide a new and improved bearing material of the type described above.

According to one aspect of the present invention we provide a bearing material comprising a metal matrix reinforced with fibres, the fibres comprising less than 50 percent by volume of the bearing material, and wherein the fibres are at least substantially completely embedded in and covered by the matrix; whereby at least no substantial amount of fibres are present at the surface of a bearing component made from the bearing material.

The fibres may comprise 10 to 25 percent by volume of the bearing material.

The fibres may be carbon fibres or asbestos fibres.

The fibres may be in the form of flock, i.e. fibres of relatively short length, for example, fibres having a maximum dimension of about 0.5 inches.

Alternatively the fibres may be relatively long fibres. For example, long carbon fibres are commercially available in tows commonly having about 10,000 fibres for each tow and the fibres being about 4 feet long. In use, in the present application, fibres of a suitable length are cut from the tow.

The maxtrix may be lead, a lead/tin alloy, or silver.

The bearing material may be provided with a steel backing strip to form a thin wall bearing component.

BRIEF DESCRIPTION OF THE DRAWINGS

The drawing is a diagrammatic plan view of an electrode assembly of a plating bath used in a method of making the composite material embodying the invention.

DESCRIPTION OF PREFERRED EMBODIMENTS

A bearing material embodying the present invention will now be described in more detail by way of example.

In this example the bearing material comprises a matrix of lead reinforced with carbon fibres.

The carbon fibres comprise 10 percent by volume of the composite material, and the fibres are completely embedded in and covered by the matrix so that the fibrous material is not anywhere exposed at a surface of the bearing material. Thus, when the bearing material is made into a bearing component the load carrying surface of the bearing is constituted solely by the matrix material and the fibres are not at all contacted by a member supported in the bearing.

The bearing material of the present invention may be used in any desired form of plan bearing. One form of bearing is a thin wall type bearing in which the bearing material is provided with a thin steel backing member of semi-cylindrical half shell or of bush shape.

The backing member is of conventional form being made of steel with a hot dipped tin coating.

The composite material may be bonded to the backing strip in any desired way.

For example, the bearing material may be placed in a die with the backing strip and hot pressed to the desired final shape of the bearing component and at the same time caused to bond to the backing strip.

Or, preferably, by hot pressing the bearing material onto the backing strip to make a flat laminate and then warm bending to laminate to half-shell or bush shape.

Although the particular case of a bearing material comprising a lead matrix with 10 percent by volume carbon fibres has been described hereinbefore, if desired the bearing material may have between about 5 to 50 percent fibre by volume and preferably between 10 and 25 percent. Instead of carbon fibres, asbestos fibres may be used and the matrix may comprise silver or a lead/tin alloy instead of lead.

Furthermore, whilst it is preferred that the fibres are completely embedded in the matrix, a satisfactory bearing is obtained so long as no substantial amount of fibres are present at the surface.

The fibres in the bearing material may be flock fibre material or long fibre material.

Two methods of making a composite material for use as a bearing material will now be described with reference to the accompanying drawing.

A plating solution was prepared from the following ingredients :

23 mls of a stannous fluoroborate solution having a specific gravity of 1.46 and containing 300 grams per litre of tin, 180 mls. of lead fluoroborate solution having a specific gravity of 1.80 and a lead content of 520 grams per litre, 36 mls of fluoroborate acid, 25 grams of boric acid, 0.5 grams of glue or gelatin and 1 gram of resorcinol and water to 1 litre.

The above plating solution was such that with a current density of 30 amps per square foot, a plated coating was obtained containing 7 percent by weight tin and 93 percent by weight lead.

As shown in the drawing, the plating bath contained an inner anode 10 which was set into the base of the bath and an outer anode assembly 11 which comprised four anode plates spaced about the inner anode 10. A cathode assembly comprising a plurality of cathode rods 12 was suspended from a supporting plate 13 of insulating material and a motor (not shown) was provided for rotating the plate 13 and thus the cathode rods 12 about a vertical axis 14 which passes through the centre of the inner anode 10. The radial spacing between the cathode rods 12 and the inner anode 10 was substantially the same as the radial spacing between the outer anodes 11 and the cathode rods 12.

The cathode rods 12 were steel rods which were partially covered by an insulating material so that each rod included a 2 cm length portion in contact with the electrolyte in the bath which was as set out above.

The motor for rotating the supporting plate 13 was arranged to rotate the cathode rods 12 about the axis 14 at a rate of the order of 30 to 60 r.p.m. A suspension of carbon fibres in water was added to the plating bath with the cathode rods 12 rotating about the axis 14 and with a stirrer provided for maintaining the carbon fibres in suspension. The carbon fibres migrated to the cathode rods and projected therefrom rather as if they were branches of a fir tree.

Plating was carried out for an hour with a current density of 30 amps per square foot, the area of the cathode being considered as including the surface area of the cathode rods plus the surface area of the carbon fibres added. Thus, when 0.15 grams of carbon fibres had been added, the surface area of the carbon fibres was of the order of 70 square inches which was considerably greater than the surface area of the portions of the steel rods of the cathode assembly which are not insulated. The major proportion, therefore, of the lead/tin alloy which is plated into the cathode assembly is plated onto the carbon fibres.

By arranging for there to be an inner anode 10 and an outer anode assembly 11, with the cathode rods 12 disposed substantially equi-distant from the inner anode 10 and the outer anode assembly 11, a substantially uniform distribution of carbon fibres on each cathode rod was obtained, this was also assisted by rotating the cathode rods about the axis 14. The carbon fibres added were of short length, their lengths being of the order of 0.1 inches to 0.125 inches and plating of the lead/tin alloy was continued until the volume of lead/tin alloy plated onto the carbon fibres was of the order of nine times the volume of the carbon fibres.

The cathode rods were removed from the plating path and the plated carbon fibres were then scrapped off the cathode rods.

A consolidation operation was then carried out in a press, the pressing being carried out within the temperature range of from 200° to 280°C with a pressure of from 20 tons per square inch to 5 tons per square inch. The pressure applied to consolidate the plated fibrous material depends on the temperature at which the pressing operation is carried out, the higher the pressing temperature the lower may be the applied pressure.

In the example described above the temperature was 220°C and the pressure was 10 tons per square inch.

A sample of the material of the above example was subjected to a punch shear test.

This test provides a means for assessing the ultimate strength of the material subjected to shear loading. The test is carried out on a Hounsfield tensometer and a steel punch is forced through a disc of the material and the maximum load (p) is recorded. The shear strength (S) is then obtained from the formula $$S = P/\pi dt$$

where
$t$ = thickness of the disc (mm) and
$d$ = diameter of the punch (mm)

A disc of material made in the above example was compared with a disc of normal lead/tin alloy.

| Material | % Theoretical Density | Punch Shear Strength (N/mm²) |
|---|---|---|
| Lead/tin alloy (93/7) (Chill cast) | 100 | 26 |
| Lead/tin alloy (93/7) + 10 vol. % shot carbon fibres | 98 | 76.4 |

The punch shear strengths provided in the table are the mean of 10 results for each material.

The bearing material may be made by methods other than those described above.

In the case of long carbon fibres, the bearing material may be made by electro plating the matrix material, for example, lead, onto long carbon fibres arranged in substantially spaced parallel relation on a cathode frame of the electrolytic bath, followed by consolidation as hereinbefore described.

I claim:

1. A bearing material comprising a bearing metal matrix, a plurality of inorganic fibres in the form of flock embedded directly in said matrix to reinforce said matrix, said fibres comprising less than 50 percent by volume of the bearing material and being randomly orientated in the matrix, and the metal matrix providing a bearing surface portion of the bearing material and there being at least no substantial amount of the fibres present at said bearing surface.

2. A bearing material according to claim 1 wherein the fibres comprise 10 to 25 percent by volume of the bearing material.

3. A bearing material according to claim 1 wherein the fibres are carbon fibres.

4. A bearing material according to claim 1 wherein the fibres are asbestos fibres.

5. A bearing material according to claim 1 wherein the fibres comprise relatively long carbon fibres.

6. A bearing material according to claim 1 wherein the fibres are arranged in a desired orientation.

7. A bearing material according to claim 1 wherein the bearing material is provided with a backing strip to form a thin wall bearing component.

8. A bearing comprising two components having bearing surfaces in sliding contact with each other, one of said components comprising a bearing material comprising a bearing metal matrix, a plurality of fibres in the form of flock embedded directly in said matrix to reinforce said matrix, said fibres comprising less than 50 percent by volume of bearing material and being randomly orientated in the matrix, and the metal matrix providing said bearing surface of the bearing material, and there being at least no substantial amount of fibres present at said bearing surface.

9. A thin wall bearing component comprising a metal backing member, a bearing metal matrix, bonded to said backing member, a plurality of fibres in the form of flock embedded directly in said matrix to reinforce said matrix, said fibres comprising less than 50% by volume of the bearing material and being randomly orientated in the matrix, and the metal matrix providing a bearing surface portion of the bearing material and there being at least no substantial amount of the fibres present at said bearing surface.

* * * * *